Nov. 30, 1954     E. L. AMUNDSON ET AL     2,695,421
METHOD AND APPARATUS FOR CONTINUOUS COATING
Filed Aug. 20, 1951     2 Sheets-Sheet 1
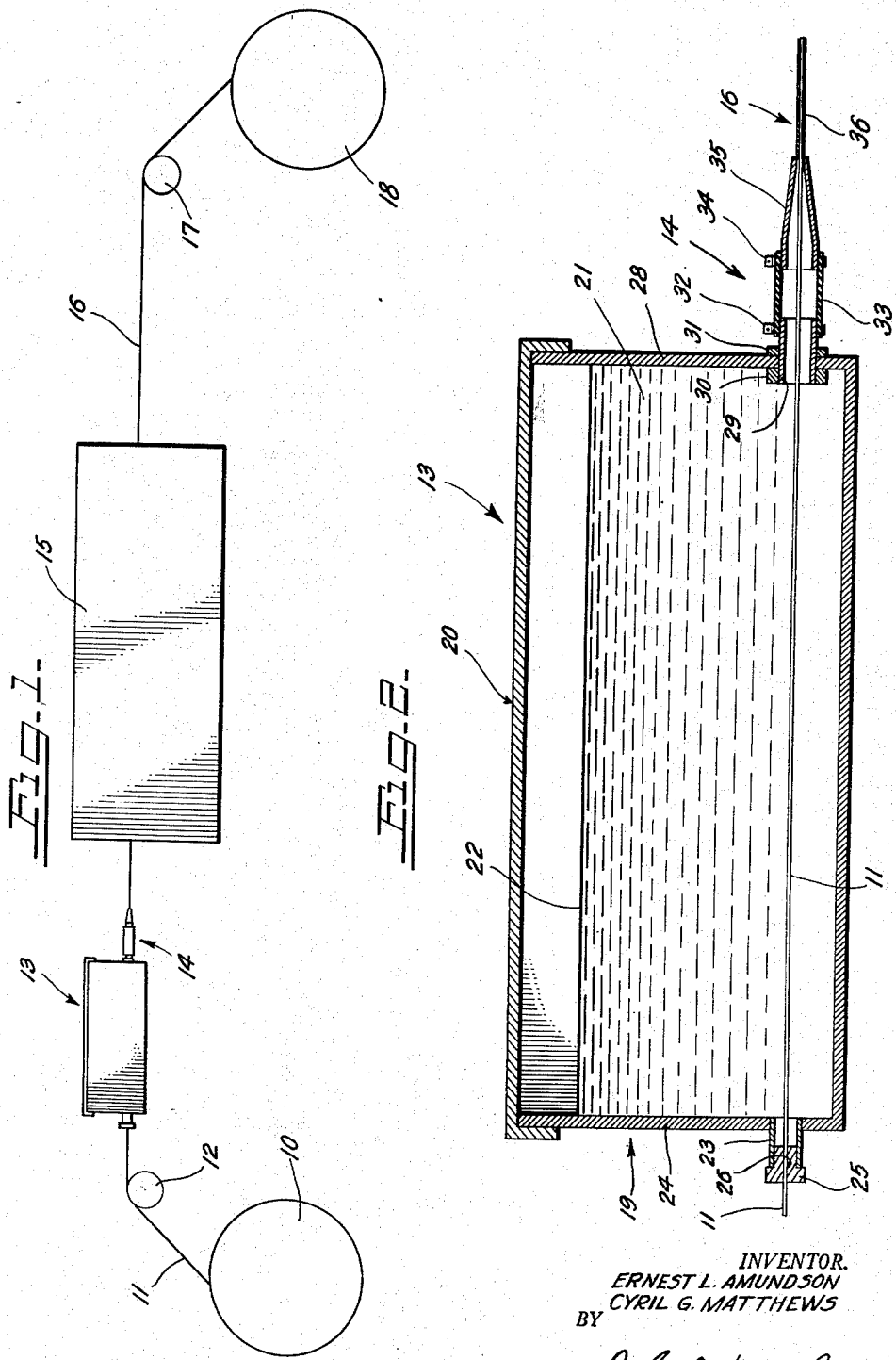
INVENTOR.
ERNEST L. AMUNDSON
CYRIL G. MATTHEWS
BY
ATTORNEY Nov. 30, 1954   E. L. AMUNDSON ET AL   2,695,421
METHOD AND APPARATUS FOR CONTINUOUS COATING
Filed Aug. 20, 1951   2 Sheets-Sheet 2
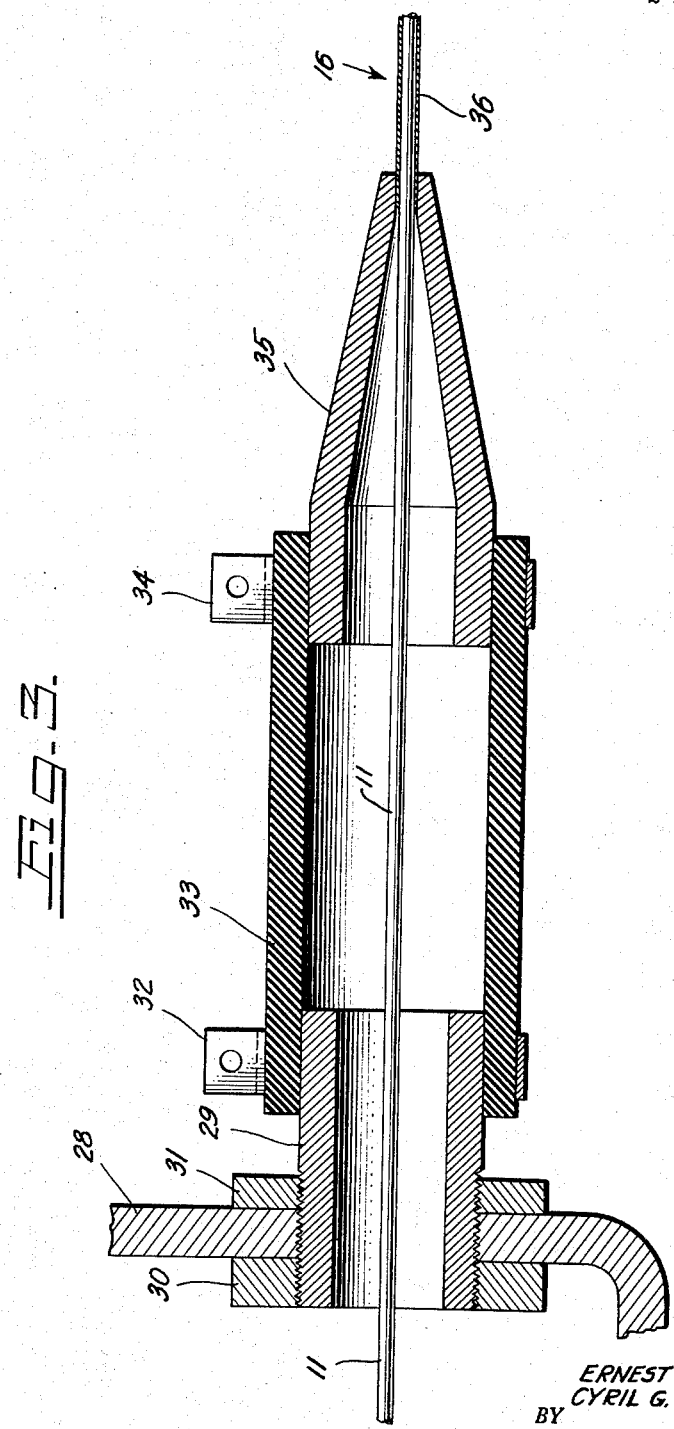
INVENTOR.
ERNEST L. AMUNDSON
CYRIL G. MATTHEWS
BY
ATTORNEY

United States Patent Office 2,695,421
Patented Nov. 30, 1954

2,695,421

METHOD AND APPARATUS FOR CONTINUOUS COATING

Ernest L. Amundson and Cyril G. Matthews, Teaneck, N. J., assignors to Plasti-Clad Metal Products, Inc., Teaneck, N. J., a corporation of New Jersey Application August 20, 1951, Serial No. 242,758

5 Claims. (Cl. 18—13)

This invention relates to new and useful improvements in method and apparatus for continuous coating of filaments and has particular relation to a method and apparatus for applying a uniform coating to continuous elements and especially to fine wires or thin strips.

An object of the invention is to provide an improved method of continuously coating filaments with a coating of uniform thickness.

Another object is to provide an improved apparatus for continuously coating filaments with a coating of uniform thickness.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a schematic elevational view showing a complete layout for coating in accordance with the present invention;

Fig. 2 is an enlarged longitudinal sectional view through the coating applying apparatus; and Fig. 3 is a similar view but further enlarged through the nozzle portion of said coating applying apparatus.

Referring in detail to the drawings and at first especially to Fig. 1, at 10 is shown a payout reel from which the continuous element, i. e., the filament, to be coated is taken. This element may be a strip of wire or the like of the desired cross sectional configuration and is hereinafter referred to as a filament and the same is shown as a wire 11 leaving the payout reel 10. Thereafter, the filament passes over a guide 12 and enters a tank 13 about which the present invention centers. From the tank the filament passes through a nozzle structure 14 and then into a drier 15 upon leaving which the coated filament 16 passes through what may be described as a cooling area, then about a guide 17 and onto a takeup reel 18.

The tank 13 may be of various constructions but here it is shown as comprising an elongated rectangular receptacle 19 having a removable cover 20 and said receptacle contains a viscous coating material 21 which may be placed therein through its open upper end when the cover 20 is removed. Preferably, there is considerable material within the receptacle 19, the same being filled as to the height indicated by the line 22 and the supply being replenished from time to time whereby at all times during operation there will be somewhat of a head on the material and the same will extend considerably above the level along which the filament moves, as will be described.

A nipple 23 in one end wall 24 of receptacle 19 communicates with the interior of said receptacle and a plug 25 in the outer end of said nipple has a small opening 26 therethrough and through which opening the filament 11 passes into the receptacle. Plug 25 may be of metal, cork, rubber, etc. but has a tight fit in the nipple 23 to plug the outer end of the latter and has a small opening therethrough for the passage of the filament or the like 11.

The coating material 21 may be any of the materials used in extrusion coating, such as "nylon," "Formvar," butyrate, "Vinylite," "Saran," "Epon."

Generally speaking, the coating material may be of any of the various materials known as plastics and which include synthetic resins, natural and synthetic plastics, cellulose and its derivatives, protein plastic substances, petroleum plastic derivatives, etc.

Various combinations of these materials may be used for the purpose of regulating resiliency, stiffness, bacteria growth, fungus growth, waterproofness, controlling the melting or softening points, control of strength factors, as elasticity, tensile and sheer strength. Many of the materials disclosed herein and which are chemically incompatible with one another are mechanically miscible to form a homogeneous mass. Thus, materials which may not be used alone for my purpose by reason of being too brittle, etc., may be mixed with other materials and in that way utilized for the characteristics they impart.

The filament 11 is continuously moved through the viscous coating material 21 within the receptacle 19 and on leaving said receptacle enters the nozzle structure generally designated 14 located at that end of the receptacle 20 remote from its end wall 24. In fact, the nozzle structure 14 is mounted on the end wall 28 of said receptacle, opposite end wall 24.

Nozzle structure 14 includes a nipple or nipple-like portion 29 passing through receptacle wall 28 and clamped thereto as by locknuts 30 and 31. About the outer end of nipple 29, a hose clamp 32 clamps one end portion of a hose or other suitably flexible tubular member 33 and a second hose clamp 34 clamps the outer or remote end of said hose section 33 about the inner end portion of a tapered nozzle 35 which, as shown, tapers downwardly toward its free or outer end, or in the direction of movement of the filament.

It will be understood that as the filament 11 to be coated is drawn through the viscous coating material 21 within the tank 13 there is a tendency of the material to adhere to the filament and there is a tendency for the filament to thereby draw the viscous coating material into the nozzle structure 14 and down into the tapered nozzle 35. Thus, while there is some pressure of the coating material on the filament within the tank 13, there is an increase of this pressure between the material and filament as the latter in moving draws the material down into the tapered nozzle 35.

Initially, the filament is chemically cleaned and because of the viscosity of the coating material and the pressure between the material and filament, especially in the tapered nozzle 35, good adhesion between the material and filament is obtained. As the coated filament leaves the free end of the nozzle 35, such coated filament is wet and must be left unsupported if the coating is not to be distorted or in any other way disturbed or redistributed.

There is a tendency of this unsupported but coated filament to vibrate and thus move up and down or sidewise and if the filament is vibrating and the nozzle is rigidly stationary, there will be unequality in the thickness of the coating material on the filament. In other words, if the filament vibrates, one portion or another of it will be carried close to or against a side of the nozzle opening so that there will be thin places in the coating at one side of a filament and opposite the same will be unduly thick coating. Specifically, the vibrated filament will not be maintained centrally of the nozzle opening.

The flexible hose 33 actually mounts the rigid tapered nozzle 35 and thus said nozzle may move sidewise or up and down with the filament. The degree of pressure created in the nozzle is due, in part, to the movement of the filament being coated, and, in part, to the viscosity of the coating material and this degree of pressure and the flexibility of the nozzle mounting, i. e., the hose 33, combine to insure a centering of the filament being coated in the nozzle and thus provide for the making of a coating of uniform thickness on the wire or other element.

If this coating is not accurate the wire will show through in the places where the coating is thinner and the coated product 16 will not be of uniform color. For uniformity of color, the coating should be uniformly accurate within 25% on all sides. In Fig. 3, the coating on the coated filament 16 is shown and such coating is, itself, designated 36.

Particles of various materials, either organic or non-organic, may be added to the viscous coating compound. Such particles must not be of greater diameter than the desired thickness of the coating. Where the particles are uniformly distributed in the coating compound, as the filament being coated passes through the nozzle, such particles will be uniform at all sides of the filament and will, along with viscosity and pressure and the flexible mounting of the nozzle, help to hold the filament centered in the nozzle.

Also, the adding of material in particle form is employed to give a coating having the desired texture. The added particles may be of pumice, Carborundum and other abrasives as well as quartz, finely sifted sand, wood flour of various types, walnut shell flour or the like. These materials in particle form create a surface condition in the coated filament or other element where a rough surface is desired and may, of course, be employed to provide a coating of controlled roughness.

Additionally, they may be used to provide an ornamental coating and in this connection it will be understood that where colored coatings are desired, various pigments are added if necessary. The added materials, when in particle form, control the uniformity and depth of coating as they assist in centering the filament being coated. The added materials may be abrasive, high heat resistant, decorative, luminous or reflective as well as roughening means, depending on the desired results.

Employing the method and means of the invention, a better, uniform coating is obtained. The coating in the present instance may be as thin as .0002 of an inch but is generally around .0005 of an inch in thickness and may run as thick as .005 of an inch. The present coatings are not comparable with painted coatings which are generally brittle, but our coatings are thinner than those usually obtained by extrusion.

Having thus set forth the nature of our invention, what we claim is:

1. The method of continuously coating a filament which consists in the straight line drawing of the filament to be coated through a bath of viscous coating material, then into a nozzle, then in axially centered relation through a rigid walled outlet orifice in the end of said nozzle with the orifice wall in concentric spaced relation to said filament and with said viscous material between said filament and said wall, and which nozzle is yieldably supported for vibratory movement of its orifice end transversely of its longitudinal axis, and then in unsupported relation from said nozzle to drawing means in axial line with said nozzle with the drawing point at such distance from said nozzle as to cause said filament to vibrate transversely of its longitudinal axis between said nozzle and said drawing point as it is drawn longitudinally, and having said viscous material of a viscosity relatively to the yieldability of said nozzle whereby said viscous material between said filament and the orifice wall transmits vibrations from said filament to said nozzle without substantial displacement of said filament from its axially centered position in said outlet orifice.

2. The method of continuously coating a filament which consists in the straight line drawing of the filament to be coated through a bath of viscous coating material, then into a nozzle having a passage tapered downwardly in the direction of movement of the filament, then in axially centered relation through a rigid walled outlet orifice in the convergent end of said nozzle passage with said orifice wall in concentric spaced relation to said filament and with said viscous material between said filament and said wall, and which nozzle is yieldably supported for vibratory movement of its orifice end transversely of its longitudinal axis, and then in unsupported relation from said nozzle to drawing means in axial line with said nozzle with the drawing point at such distance from said nozzle as to cause said filament to vibrate transversely of its longitudinal axis between said nozzle and said drawing point as it is drawn longitudinally, and having said viscous material of a viscosity relatively to the yieldability of said nozzle whereby said viscous material between said filament and said rigid orifice wall transmits vibrations from said filament to said nozzle without substantial displacement of said filament from its axially centered position in said outlet orifice.

3. In combination in a coating apparatus, a tank to receive a viscous coating material through which a filament to be coated is drawn and wherein there is a discharge opening for the exit of said filament, a coating nozzle connected in said discharge opening in axial line therewith and including a mounting end part attached to said tank, an outlet end part having a rigid walled orifice through which said filament is adapted to be drawn with the orifice wall in concentric spaced relation to said filament and with viscous material between said filament and said wall, and yieldable means carried by said mounting end part and yieldably supporting said outlet end part for vibration transversely of the axis of said orifice, and filament drawing means spaced from and in axial line with said nozzle.

4. In combination in a coating apparatus, a tank to receive a viscous coating material through which a filament to be coated is drawn and wherein there is a discharge opening for the exit of said filament, a coating nozzle connected in said discharge opening in axial line therewith and including a mounting end part attached to said tank, an outlet end part having a passage therethrough tapered downwardly in the direction of movement of the filament and having a rigid walled orifice at the convergent end of said passage through which said filament is adapted to be drawn with the orifice wall in concentric spaced relation to said filament and with viscous material between said filament and said wall, and yieldable means carried by said mounting end part and yieldably supporting said outlet end part for vibration transversely of the axis of said orifice, and filament drawing means spaced from and in axial line with said nozzle.

5. In combination in a coating apparatus, a tank to receive a viscous coating material through which a filament to be coated is drawn and wherein there is a discharge opening for the exit of said filament, a coating nozzle connected in said discharge opening in axial line therewith and including a mounting nipple engageable in said discharge opening attached to said tank, an outlet nozzle having a rigid walled orifice through which said filament is adapted to be drawn with the orifice wall in concentric spaced relation to said filament and with viscous material between said filament and said wall, and a flexible tube secured at one end to said nipple and secured at the other end to said outlet nozzle for yieldably supporting said outlet nozzle for vibration transversely of the axis of said orifice, and filament drawing means spaced from and in axial line with said nozzle.

References Cited in the file of this patent

UNITED STATES PATENTS

| Number | Name | Date |
|---|---|---|
| 576,702 | True | Feb. 9, 1897 |
| 1,776,073 | Girard | Sept. 16, 1930 |
| 1,802,605 | Kemp | Apr. 28, 1931 |
| 2,199,067 | Bradt | Apr. 30, 1940 |
| 2,260,860 | Newton | Oct. 28, 1941 |
| 2,390,823 | Bennett | Dec. 11, 1945 |